June 3, 1947.　　C. M. HATHAWAY　　2,421,420
ELECTRICAL GAGING APPARATUS
Filed Nov. 8, 1943
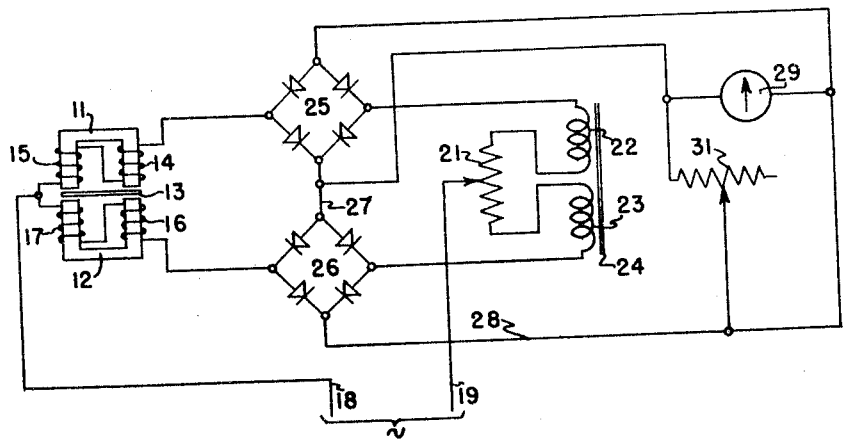
INVENTOR.
CLAUDE M. HATHAWAY
BY *Alois W Graf*
ATTORNEY Patented June 3, 1947

2,421,420

UNITED STATES PATENT OFFICE 2,421,420

ELECTRICAL GAGING APPARATUS

Claude M. Hathaway, Denver, Colo., assignor to Hathaway Instrument Company, a corporation of Colorado Application November 8, 1943, Serial No. 509,437

7 Claims. (Cl. 177—351)

My invention relates to electric measuring apparatus and, more particularly, to apparatus for measuring the stress or strain in a body.

In measuring apparatus, particularly of the type which is to indicate compression or tension on the surface of a body under test, it is desired to obtain a sensitive accurate indication which will be indicative of whether the surface is being subjected to compression or tension strain. In a similar measuring apparatus commonly known as a comparator gage it also is desired to know as to whether a body is over or under a predetermined standard. In such instrument it also is desirable to obtain sensitivity and an indication as to how much a body varies over or under the standard set.

In accordance with the present invention, strain gages or comparator gages of the type utilizing a pair of variable impedances arranged to vary oppositely in accordance with a variable factor to be indicated, are connected to energize a circuit utilizing a pair of bridge rectifiers. In order that maximum sensitivity may be obtained the bridge rectifiers are arranged to be energized by circulating currents so that when the comparator gage or the strain gage is actuated the bridge rectifiers will be operating at their maximum sensitivity. Furthermore, in accordance with the present invention, a circuit arrangement is provided whereby the variable impedances comprising the gage unit are connected in a circuit which is readily balanced to a zero condition, independent of line voltage or alternating current voltage variations.

It therefore is an object of my invention to provide an improved displacement measuring apparatus which has a high degree of sensitivity.

Another object of my invention is to provide an improved displacement measuring apparatus wherein the zero position of the instrument is readily adjusted and where such position is independent of voltage variations.

Still another object of my invention is to provide an indicating apparatus or circuit energized from differentially connected bridge rectifiers operating at their maximum sensitivity.

My invention is set forth with particularity in the appended claims. Its construction and method of operation will subsequently become apparent together with further objects and advantages thereof, by reference to the following description taken in connection with the accompanying drawing wherein the figure is a schematic circuit representation of an arrangement embodying the present invention.

Referring more particularly to the figure, there is disclosed a measuring gage circuit which may be either a strain gage or a comparator gage. For the purposes of simplifying the explanation it may be assumed that the invention is to be used as a strain gage. A strain gage includes a unit comprising at least a pair of variable impedances arranged to vary oppositely in accordance with a variable factor to be indicated, such as tension or compression, as observed at the surface of a body under stress or strain. Such unit may comprise two electromagnetic core structures 11 and 12 which are U-shaped and are provided with a coil or variable impedance on each leg of the core structure. The two core structures 11 and 12 are arranged adjacent a common armature 13 which is adapted to be moved in response to compression or tension or some other variable factor farther from one of the core structures and closer to the other core structure. The one U-shaped core structure 11, therefore, is provided with serially connected coils 14 and 15 and the other core structure 12 is similarly provided with two coils 16 and 17. Due to the change in the reluctance of the magnetic circuits of the cores 11 and 12 upon displacement of the armature 13, the two coils 14 and 15 will operate as variable impedances changing in one sense while the other coils 16 and 17 operate as variable impedances changing in an opposite sense. In other words, the impedance of one pair of coils increases while the impedance of the other pair of coils decreases. The direction in which such change takes place is dependent upon whether the armature 13 is being moved or displaced in response to tension or compression. The variable impedances 14 to 17 are connected in a circuit arranged to be energized from a suitable source of alternating current connected to two conductors 18 and 19. This source of alternating current preferably is of a frequency in the vicinity of several thousand cycles. The conductor 18 is connected to the common juncture between the inductance coils 15 and 17. The other alternating current conductor 19 is connected to an adjustable contact on a voltage divider 21 which is connected between a pair of inductances 22 and 23 supported on a common core structure 24. The remaining terminal of the one inductor 22 is connected to one terminal of one diagonal of a bridge rectifier 25, the opposite terminal of this diagonal being connected to the coil 14 which is in series with the coil 15. The other terminal of the balancing inductance 23 is connected to one terminal of a diagonal of another bridge rectifier 26, and the other terminal of that diagonal is connected to the serially connected coils 16 and 17. With the armature 13 positioned in the proximity of the center of the air gap between the cores 11 and 12 an exact balance may be obtained by moving the adjustable contact on the voltage divider 21 so that for this condition prior to the application of stress or strain the outputs of the bridge rectifiers 25 and 26 will be balanced.

With a balance obtained by the adjustment of the contact on the voltage divider 21, it becomes apparent that across the other diagonals of the bridge rectifiers 25 and 26 direct currents may now appear which are permitted to flow through the conductors 27 and 28. A zero center direct current instrument 29 is connected between the conductors 27 and 28 so as to be responsive to the difference in direct current power output between the bridge rectifiers 25 and 26. In order to control the sensitivity of the indicating instrument 29 this instrument may be shunted by an adjustable resistor 31. By providing a circuit arrangement such as this a circulating current flows through the conductors 27 and 28 which produces no indication on the instrument 29 and which reduces the resistance of the bridge rectifiers so that they are operating at their maximum sensitivity so as to be responsive to slight changes in the impedances of the strain gage coils 14 to 17.

If it is assumed that the conductor 18 is positive with respect to the conductor 19, current will flow from the conductor 18 to the juncture of the coils 15 and 17. A portion of the current flows through the coils 15 and 14 through the rectifier 25 and the impedance 22 to the resistor 21, which has an adjustable contact connected to the conductor 19. Similarly current flows through the coils 17 and 16 and through the bridge rectifier 26 through the impedance 23 and a portion of the resistor 21 to the conductor 19. If the member 13 is equally spaced between the cores 11 and 12, the currents in the two circuits thus described will be equal.

The current flowing through the coils 15 and 14 passes through the lower left rectifier in the bridge 25 and flows through the instrument 29 back to the upper right rectifier of the bridge 25 and then to the coil 22. Similarly the current flowing through the coils 17 and 16 first passed through the lower left rectifier and then the upper right rectifier before reaching the fixed impedance mounted on the core 24. The unidirectional currents flowing through the rectifiers are equal when the air gaps on opposite sides of the member 13 are equal. Where the currents in the two circuits described are equal, they have no effect upon the instrument 29. With a balanced condition of the armature 13, circulating current flows through the bridge rectifiers 25 and 26, thereby to keep their resistance at a low value.

While for the purposes of explanation certain circuit arrangements have been shown, it, of course, is to be understood that I do not wish to be limited thereto since obviously variations in the circuit arrangements and in the instrumentalities employed may be made without departing from the spirit and scope of the appended claims.

I claim:

1. In a strain measuring apparatus, the combination comprising a pair of variable impedances arranged to vary oppositely in accordance with the strain to be indicated, a pair of fixed impedances, a pair of bridge rectifiers, a source of alternating current, means connecting one of said variable impedances in a series circuit with one of said fixed impedances and one diagonal of one of said bridge rectifiers, means connecting the other of said variable impedances in a series circuit with the other one of said fixed impedances and one diagonal of the other one of said bridge rectifiers, means connecting each of said circuits across a source of alternating current, means for balancing the impedances of said circuits, an indicating instrument, and circuit means connecting said instrument and the other diagonals of said rectifiers differentially whereby said instrument will indicate the magnitude and direction of the strain measured.

2. In a strain measuring apparatus, the combination comprising a pair of variable impedances arranged to vary oppositely in accordance with the strain to be indicated, a pair of fixed impedances, a pair of bridge rectifiers, a source of alternating current, means connecting one of said variable impedances in a series circuit with one of said fixed impedances and one diagonal of one of said bridge rectifiers, means connecting the other of said variable impedances in a series circuit with the other one of said fixed impedances and one diagonal of the other one of said bridge rectifiers, means for energizing said circuits in parallel from said source of alternating current, means for balancing the impedances of said circuits, a circuit connecting said remaining diagonals of said rectifiers in opposition to each other, and a direct current zero center indicating instrument connected to indicate the resultant flow of current in said latter circuit.

3. In a strain measuring apparatus, the combination comprising a pair of variable impedances arranged to vary oppositely in accordance with the strain to be indicated, a pair of fixed impedances, a pair of bridge rectifiers, a source of alternating current, means connecting one of said variable impedances in a series circuit with one of said fixed impedances and one diagonal of one of said bridge rectifiers, means connecting the other of said variable impedances in a series circuit with the other one of said fixed impedances and one diagonal of the other one of said bridge rectifiers, means for energizing said circuits in parallel from said source of alternating current, means for balancing the impedances of said circuits, a circuit connecting said remaining diagonals of said rectifiers in opposition to each other, a zero center direct current indicating instrument connected to indicate the resultant flow of current in said latter circuit, and means for varying the sensitivity of said instrument.

4. In a displacement measuring apparatus, the combination comprising a pair of variable impedances arranged to vary in opposite senses in accordance with the displacement to be indicated, a pair of fixed impedances, a pair of bridge rectifiers, a pair of series circuits each including a variable impedance, a fixed impedance and a bridge rectifier, adjustable means for producing equal energization of said circuits from a source of alternating current, a zero center direct current indicating instrument differentially connected to the outputs of said bridge rectifiers, and adjustable shunt means for controlling the sensitivity of said direct current indicating instrument.

5. A displacement measuring apparatus comprising a pair of variable impedances arranged to vary in opposite senses in accordance with the displacement to be indicated, a pair of fixed impedances, a pair of bridge rectifiers, means connecting said elements into a pair of series circuits each including a variable impedance, a fixed impedance, and a bridge rectifier, adjustable means for producing equal energization of said currents from the source of alternating current, and a direct current indicating instrument differentially connected to the outputs of said bridge rectifiers.

6. In a displacement measuring apparatus the combination comprising a pair of variable impedances arranged to vary in opposite senses in accordance with the displacement to be indicated, a pair of fixed impedances, a pair of bridge rectifiers, a pair of circuits each including one of said variable impedances and one of said fixed impedances in series, means for producing equal energization of said circuits from a source of alternating current, each of said bridge rectifiers being arranged to be energized from one of said circuits, and an indicating instrument differentially connected to the outputs of said rectifiers.

7. A displacement measuring apparatus comprising a bridge circuit having a pair of variable impedances arranged to vary in opposite senses in accordance with displacement to be indicated, a pair of fixed impedances, means for supplying alternating current from a source to a diagonal of said bridge circuit extending between the juncture of the pair of fixed impedances and the juncture of the pair of variable impedances, a pair of bridge rectifiers, a zero center direct current indicating instrument differentially connected to the output diagonals of said bridge rectifiers, and connections from the remaining diagonal of said impedance bridge circuit to the remaining series connected diagonals of said bridge rectifiers for differentially energizing said rectifiers in accordance with the unbalance of said impedance bridge circuit.

CLAUDE M. HATHAWAY.

REFERENCES CITED

The following references are of record in the file of this patent:

UNITED STATES PATENTS

| Number | Name | Date |
| --- | --- | --- |
| 1,964,141 | Rhodes et al. | June 26, 1934 |
| 2,240,184 | Hathaway | Apr. 29, 1941 |
| 2,269,152 | Hathaway | Jan. 6, 1942 |
| 2,269,584 | Eldredge | Jan. 13, 1942 |
| 2,276,843 | Hathaway | Mar. 17, 1942 |
| 2,338,732 | Nosker | Jan. 11, 1944 |

FOREIGN PATENTS

| Number | Country | Date |
| --- | --- | --- |
| 548,105 | Great Britain | Sept. 24, 1942 |
| 49,262 | France | Feb. 16, 1939 |